US012811788B2

(12) United States Patent
Atkinson et al.

(10) Patent No.: US 12,811,788 B2
(45) Date of Patent: Nov. 24, 2026

(54) POWER ONBOARDING FOR DATA PROCESSING SYSTEMS USING POWER-BASED COMMUNICATIONS

(71) Applicant: Dell Products L.P., Round Rock, TX (US)

(72) Inventors: Christopher Bauer Atkinson, Woodstock, GA (US); Ethan A. Kaley, North Kingstown, RI (US); Kirk Frey, Flemington, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/931,587

(22) Filed: Oct. 30, 2024

(65) Prior Publication Data

US 2026/0121855 A1 Apr. 30, 2026

(51) Int. Cl.
*H04L 9/32* (2006.01)

(52) U.S. Cl.
CPC .................................... *H04L 9/32* (2013.01)

(58) Field of Classification Search
None
See application file for complete search history.

(56) References Cited

U.S. PATENT DOCUMENTS 9,985,731 B1 5/2018 Khojasteh
10,672,537 B2 6/2020 Goergen et al.
2005/0097369 A1 5/2005 Bowser
2007/0165345 A1 7/2007 Woo
2007/0223520 A1 9/2007 Diab
2009/0063874 A1 3/2009 Diab
2011/0035611 A1 2/2011 Brey
2011/0276289 A1 11/2011 Park
2015/0025688 A1 1/2015 Hille
2016/0170463 A1 6/2016 Agrawal
2016/0179117 A1 6/2016 Eastep
(Continued)

OTHER PUBLICATIONS

"What Is Power Line Communication (PLC)?", Nessum, Dec. 20, 2021, Web Page <https://nessum.org/media/technology-blog/what-is-power-line-communication> accessed on Oct. 30, 2024 (8 Pages).
(Continued)

*Primary Examiner* — Nelson S. Giddins
(74) *Attorney, Agent, or Firm* — WOMBLE BOND DICKINSON (US) LLP

(57) ABSTRACT

Methods and systems for managing a data processing system are disclosed. The data processing system may obtain first power from a power distribution unit (PDU) via a multi-function connection. Based on a magnitude of the first power, a validation process may need to be performed before other power is made available to the data processing system from the PDU. During the validation process, the data processing system may, via the multi-function connection, provide identification information to and receive a response from the PDU. The response may indicate characteristics of power that the PDU believes is warranted for the data processing system based on the identification information. The data processing system may be placed in a new power state based on the characteristics of the power in order to provide computer-implemented services.

20 Claims, 7 Drawing Sheets

(56) References Cited

U.S. PATENT DOCUMENTS

| | | | | |
|---|---|---|---|---|
| 2016/0363980 | A1 | 12/2016 | Spiel | |
| 2019/0272011 | A1 | 9/2019 | Goergen | |
| 2020/0092375 | A1 * | 3/2020 | Clark | H04L 9/3249 |
| 2021/0141680 | A1 | 5/2021 | Johnson | |
| 2022/0075338 | A1 * | 3/2022 | Uthaicharoenpong | G05B 19/042 |
| 2024/0178706 | A1 * | 5/2024 | Jacobson | B60L 50/53 |
| 2024/0353909 | A1 | 10/2024 | Nieuwsma | |

OTHER PUBLICATIONS

Kalinich, Sean, "Cooler Master build PowerLine Ethernet into PSU," Jun. 5, 2009, Updated Nov. 3, 2020, Web Page <https://www.tweaktown.com/news/12419/cooler_master_build_powerline_ethernet_into_psu/index.html> accessed on Oct. 30, 2024 (2 Pages).

* cited by examiner

POWER ONBOARDING FOR DATA PROCESSING SYSTEMS USING POWER-BASED COMMUNICATIONS

FIELD

Embodiments disclosed herein relate generally to managing data processing systems. More particularly, embodiments disclosed herein relate to systems and methods for managing power onboarding for the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
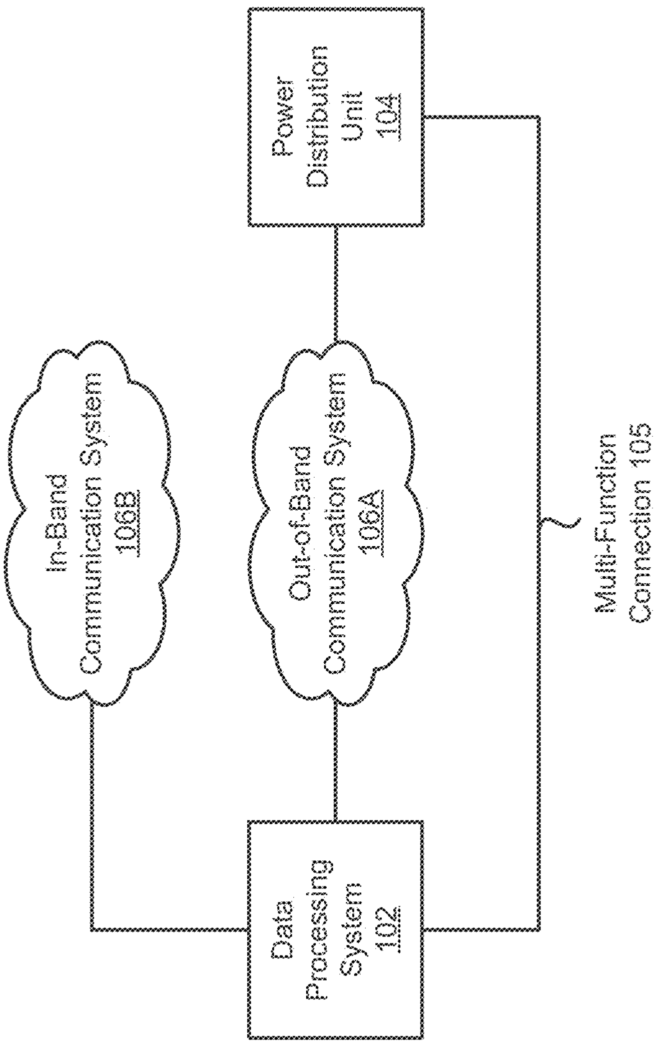
FIG. 1A shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing system may provide computer-implemented services to downstream consumers. To provide the computer-implemented services, the data processing system may obtain power from a power distribution system.

The power distribution system may convert large scale power input (e.g., from a utility power grid) to small scale power (e.g., usable by a data processing system), and may distribute the converted power to a deployment of data processing systems. The power distribution system may include multiple power distribution units (PDUs) and other components (e.g., power panels, transfer switches, back-up generators) that participate in distributing power to the deployment. Each PDU of the power distribution system may provide power to data processing systems connected to each of the PDUs via distinct power connections. For example, the PDUs may include rack PDUs that supply power to servers in a data center, or electrical wall outlets that provide power to personal devices (e.g., laptops, mobile phones, tablets) at a place of business (e.g., an airport, a coffee shop, an office building).

A power port (e.g., a power receptacle) of a PDU may begin to provide power to a data processing system upon establishment of a power connection between the data processing system and the power port. The power provided via the power port may include a magnitude of power sufficient for the data processing system to operate in a desired power state. For example, to provide desired computer-implemented services, the data processing system may need to operate in a high-power state. To do so, the data processing system may draw a large magnitude of power (up to a rated capacity of the PDU), which may cause unexpected (e.g., sudden, gradual) increases in power consumption. Occurrences of unexpected increases (e.g., spikes) in power consumption by large numbers of data processing systems may negatively impact the power distribution system, operation of other data processing systems of the deployment and/or a quality of the computer-implemented services. In addition, the occurrences of unexpected increases may overload a fragile utility power grid that supplies the power distribution system with power.

To reduce a likelihood of occurrences of unexpected increases in power consumption, power consumption by data processing systems supplied by the power distribution system may be managed (e.g., controlled, limited). To do so, power onboarding may be performed for each data processing system upon establishing connections with a PDU of the power distribution system. During power onboarding, an identity of the data processing system may be established with the PDU, and the PDU may provide power to the data processing system in a manner that the PDU believes is warranted for the data processing system (e.g., based on a variety of factors). For example, the PDU may limit magnitudes of power provided to the data processing system over time to prevent occurrences of unexpected increases in power consumption by the data processing system.

To do so, the data processing system may be connected to the PDU via a multi-function connected adapted to both supply power to the data processing system and facilitate communication between the data processing system and the PDU. Data may be exchanged between the PDU and the data processing system during power onboarding using power-line communication technology. For example, the data may be exchanged to verify authenticity of the data processing system, and/or to identify power privileges for the data processing system. Based on the power privileges and/or other information (e.g., power demands on the PDU and/or the power distribution system), during power onboarding the PDU may provide the data processing system with a response indicating characteristics of power that the PDU believes is warranted for the data processing system. The response may prompt the data processing system to enter a new power state that reflects the characteristics. While operating in the new power state, the data processing system may provide computer-implemented services.

By doing so, existing multi-function connections (e.g., power connections) between data processing systems and PDUs may be used to reduce likelihoods of occurrences of unexpected increases in power consumption by the data processing systems, and to otherwise manage power distribution and consumption over time at the power port level. As a result, the deployment may be more likely to provide desired (e.g., reliable, uninterrupted and/or otherwise expected) computer-implemented services without requiring additional types of connections between the data processing systems and the PDUs.

In an embodiment, a method for managing a data processing system is provided. The method may include: obtaining, by the data processing system and via a multi-function connection, first power from a power distribution unit (PDU), the multi-function connection being adapted to both supply power to the data processing system and facilitate communication between the data processing system and the PDU; and, making a determination, by the data processing system, regarding whether a validation process needs to be performed based on a magnitude of the first power before second power of sufficient magnitude will be made available to the data processing system from the PDU.

In a first instance of the determination where the validation process needs to be performed, the method may include: providing, by the data processing system and via the multi-function connection, identification information usable to establish an identity of the data processing system to the PDU; obtaining, by the data processing system and via the multi-function connection, a response from the PDU, the response indicating characteristics of third power that the PDU believes is warranted for the data processing system; enforcing, by the data processing system and based on the characteristics of the third power, a new power state on at least hardware resources of the data processing system to obtain an updated data processing system; and, providing, by the updated data processing system, a computer-implemented service.

The identification information may include cryptographically verifiable information usable to identify power privileges for the data processing system. The identification information may include an identifier for the data processing system. The identification information may include a signed data structure, the signed data structure being signed using a private key controlled by the data processing system, and the PDU having access to a public key corresponding to the private key.

Enforcing the new power state may modify power consumption by the data processing system in accordance with the power privileges. The new power state may be enforced at a point in time indicated by the response. The response may be based on input from a management entity of the PDU.

The providing of the identification information and the obtaining of the response may be performed while the first power is being distributed via the multi-function connection.

The data processing system may include an intermediary device adapted to pass power obtained from the PDU to a power source of the data processing system, the intermediary device being connected to the PDU via the multi-function connection, and the power source not being connected to the PDU via any multi-function connections. The intermediary device may provide the identification information to the PDU and obtain the response from the PDU.

The PDU may be adapted to obtain data center level power and supply power source level power via distinct multi-function connections to at least the processing system.

The data processing system may be connected to the PDU via an out-of-band communication channel that runs through a network module of the data processing system and the out-of-band communication channel may service a management controller of the data processing system.

The data processing system may be connected to at least one other entity via an in-band communication channel that also runs through the network module and the in-band communication channel may service the hardware resources.

A non-transitory media may include computer instructions that when executed by a processor cause the computer-implemented method to be performed.

The data processing system may include the non-transitory media and a processor, and may perform the computer-implemented method when the computer instructions are executed by the processor.

Turning to FIG. 1A, a block diagram illustrating a distributed system in accordance with an embodiment is shown. The system shown in FIG. 1A may provide computer-implemented services. The computer-implemented services may include any type and quantity of computer-implemented services. For example, the computer-implemented services may include communication services, data storage services, database services, data generation services, and/or any other type of service that may be implemented with a computing device.

To provide the computer-implemented services, the distributed system may include a deployment of any number of data processing systems. Each data processing system of the deployment may include hardware resources (e.g., hardware and/or software components) and may independently and/or in some combination with other data processing systems of the deployment, provide a portion of the computer-implemented services. The data processing systems may each include a power source that provides power to the hardware resources, and the power sources may be supplied with power through distinct power connections to components of a power distribution system.

The power distribution system may include various components for obtaining data center level power and supplying power source level power (e.g., usable by the power sources of the data processing systems) via the distinct power connections. For example, the power distribution system may include power panels, transfer switches, back-up generators, power distribution units (PDUs), and/or other components that participate in distributing power (e.g., converting power and/or otherwise managing the supply of power) to the data processing systems.

In a first example, the data processing systems may include racks of servers, and the servers may be connected (via distinct power connections) to power receptacles of rack PDUs of a power distribution system for a data center. In a second example, the data processing systems may include personal devices (e.g., laptops, mobile phones, tablets), and the personal devices may be connected (via distinct power connections) to electrical outlets of wall outlets or power strips of the power distribution system for a building (e.g., a dwelling, a place of business).

Upon establishing a power connection with a PDU, a data processing system may begin to draw a magnitude of power required to operate the data processing system in its current or desired state. In other words, the PDUs of the power distribution system may provide power to any connected data processing systems indiscriminately. For example, as data processing systems are connected to various PDUs, the data processing systems may immediately begin to draw a magnitude of power up to a rated capacity of the PDU, which may cause unexpected (e.g., sudden, gradual) increases in power consumption.

Impacts of indiscriminate distribution of power via the PDUs may include, for example, (i) unexpected increases in energy costs, (ii) sudden spikes in power consumption that may increase risk of damage to components of the power distribution system and/or components of a utility power grid that supplies the power distribution system with power, (iii) unexpected burden on the power distribution system and/or the utility power grid, and/or (iv) other issues that may risk damage to infrastructure and/or make power consumption difficult to predict and manage over time (e.g., in terms of load balancing, energy costs, etc.).

Therefore, to reduce a likelihood of occurrences of unexpected increases in power consumption (e.g., to prevent negative impacts of the occurrences), power onboarding may be performed for data processing systems establishing power connections with the power distribution system so that power consumption by each data processing system may be managed at the PDU (e.g., power port) level.

In general, embodiments disclosed herein may provide methods, systems, and/or devices for managing power onboarding for data processing systems using power-based communications. To do so, the connections used to power the data processing systems via the PDUs may include multi-function connections that both supply power to the data processing systems and facilitate communication between the data processing systems and the PDUs. Using the multi-function connections, data usable for performing power onboarding may be exchanged between the PDUs and the data processing systems while power is being distributed.

For example, during power onboarding, the PDU may provide the data processing system with an initial magnitude of power (e.g., a magnitude of power insufficient for the data processing system to operate in a desired state) sufficient for performing a validation process. During the validation process, an identity of the data processing system may be established (e.g., validated) with the PDU, and the PDU may enter a new power mode corresponding to the established identity of the data processing system. The new power mode may enable the PDU to provide a magnitude of power warranted for the data processing system (e.g., according to policies and/or power privileges for the data processing system). The data processing system may enter a new power state that corresponds with the magnitude of power provided by the PDU (while the PDU is in the new power mode) in order to provide computer-implemented services.

Thus, power consumed by each data processing system receiving power via the power distribution system may be proactively managed over time using existing multi-function connections. By doing so, occurrences of power consumption spikes may be more likely to be reduced (e.g., via power ramping), occurrences of unexpected increases in power consumption may be prevented, and power load management (e.g., balancing) at various levels in the power supply chain (e.g., at the PDU level, at the data center level, at the utility power grid level) may be improved.

To provide the above-mentioned functionality, the distributed system of FIG. 1A may include data processing system 102, power distribution unit 104, and any number of communication systems (e.g., out-of-band communication system 106A, in-band communication system 106B). The distributed system, any components thereof, and/or any other types of devices or components not shown in FIG. 1A may perform all, or a portion of the computer-implemented services independently and/or cooperatively. Each of these components is discussed below.

Data processing system 102 may include any number of data processing systems. Data processing system 102 may provide computer-implemented services while hardware resources of data processing system 102 are operational (e.g., powered). For example, data processing system 102 may include a single data processing system, a group of data processing systems (e.g., the group receiving power from a single PDU of the power distribution system), and/or a deployment of data processing systems (e.g., the groups of data processing systems receiving power from multiple PDUs of the power distribution system). In the example shown in FIG. 1A, data processing system 102 may be connected to power distribution unit 104. For example, power may be provided to data processing system 102 from power distribution unit 104 via multi-function connection 105.

Multi-function connection 105 may include a power connection (e.g., a power cable) adapted to both (i) supply power to data processing system 102, and (ii) facilitate at least one-way communication between connected entities (e.g., data processing system 102 and power distribution unit 104). For example, a component of data processing system 102 (e.g., a power source) may transmit identification information for data processing system 102 to power distribution unit 104 (and/or may obtain responses from power distribution unit 104) via multi-function connection 105 using power-line communication technology.

Power distribution unit 104 may include at least one of any number of PDUs of a power distribution system that distributes power to a deployment including data processing system 102. Power distribution unit 104 may include any type of PDU, such as a basic PDU, a smart metered PDU, a switched PDU, an intelligent rack PDU, etc., and may include any number and/or type of power ports (e.g., power receptacles). In addition to use in PDUs, other types of power provisioning devices may include similar functionality. For example, other types of power provisioning devices may include smart outlets, smart receptacles, smart surge protectors, smart power strips, and/or other devices that may regulate distribution of power from a source of power (e.g., utility level power).

Power distribution unit 104 may supply power to at least data processing system 102 (e.g., as well as other data processing systems of the deployment, not shown). For example, power distribution unit 104 may supply power to data processing system 102 via multi-function connection 105, and to other data processing systems via distinct multi-function connections (not shown) similar to multi-function connection 105.

To participate in power onboarding for data processing system 102, power distribution unit 104 may include functionality for communicating with connected devices. For example, power distribution unit 104 may include a component such as a power manager (e.g., a microcontroller)

adapted to transmit data to data processing system 102 (and/or to obtain data from data processing system 102) via multi-function connection 105 using power-line communication technology.

Power distribution unit 104 (e.g., the power manager) may use multi-function connection 105 to (i) monitor and/or report (e.g., to a remote management entity) magnitudes of power consumed by connected (e.g., powered) data processing systems over time, and/or (ii) enforce policies regarding limits on power made available to each of the connected data processing systems. For example, the policies may specify power modes for power distribution unit 104. The power modes may define limitations on power supplied to data processing systems over time in order to prevent power consumption spikes, unexpected increases in power consumption, and/or to balance power demands across the deployment. Refer to the discussion of FIG. 1C for more information regarding power distribution by power distribution unit 104.

To participate in power onboarding (e.g., to manage power consumption by the hardware resources of data processing system 102), components of data processing system 102 may, for example, (i) obtain a magnitude of power (e.g., power obtained from power distribution unit 104 via multi-function connection 105), (ii) determine whether validation processes need to be performed (e.g., based on the magnitude of the power and a power threshold), (iii) store and/or provide (e.g., to power distribution unit 104 via multi-function connection 105) data, such as identification information for data processing system 102, (iv) obtain data (e.g., responses from power distribution unit 104 via multi-function connection 105), (v) identify and/or enforce new power states on the hardware resources (e.g., based on the responses), and/or (vi) provide computer-implemented services using the hardware resources while the hardware resources are operating in the new power states.

Identification information stored by data processing system 102 may be usable to establish an identity of data processing system 102 with power distribution unit 104 (e.g., during a validation process). Mutual trust between data processing system 102 and power distribution unit 104 may be established using the identification information, and the identification information may correspond to a power mode for power distribution unit 104 that may define how power is to be distributed to data processing system 102 over time.

To manage power states for the hardware resources, data processing system 102 may include out-of-band components. The out-of-band components may include functionality for managing operation of the hardware resources and/or communicating with other devices using out-of-band methods (e.g., exchanging data with the other devices using out-of-band communication channels that circumvent in-band communication channels servicing the hardware resources). For example, the out-of-band components may exchange data with other components of data processing system 102 (e.g., the hardware resources) and/or a remote management entity of data processing system 102 in order to manage power consumption by the hardware resources. Refer to the discussion of FIG. 1B for more information regarding components of data processing system 102.

Figure 2A:
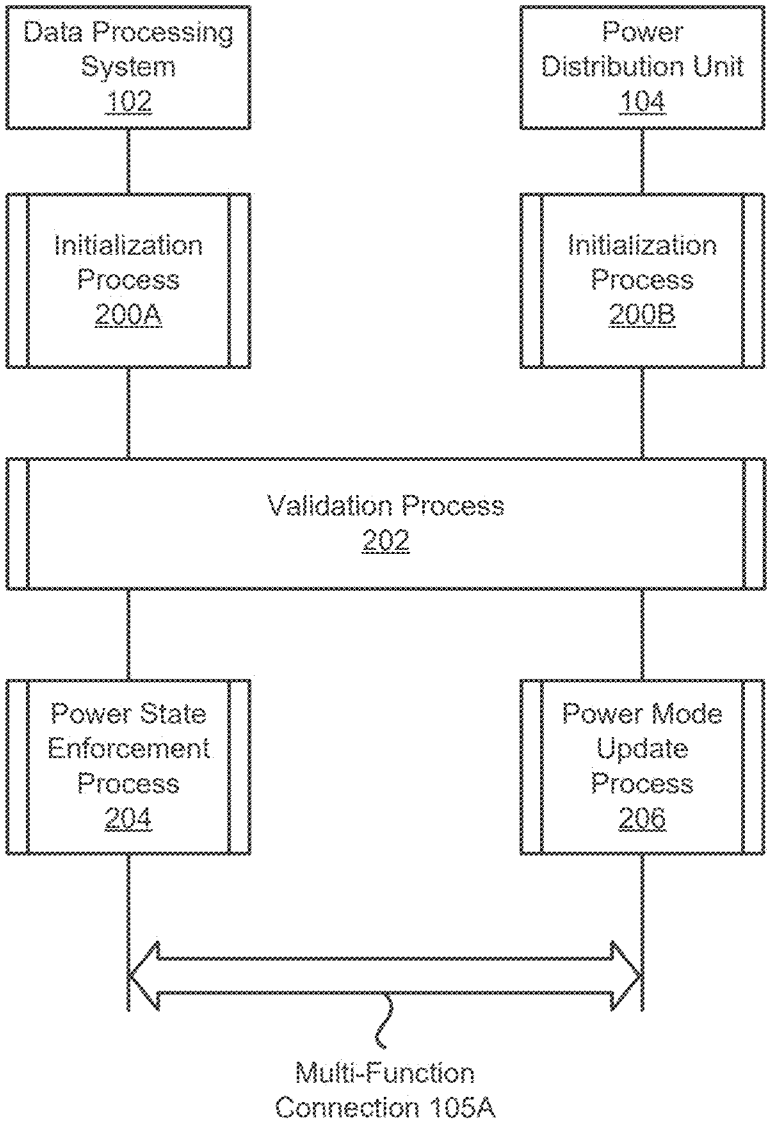
FIGS. 2A-2B show interaction diagrams in accordance with an embodiment.
Figure 2B:
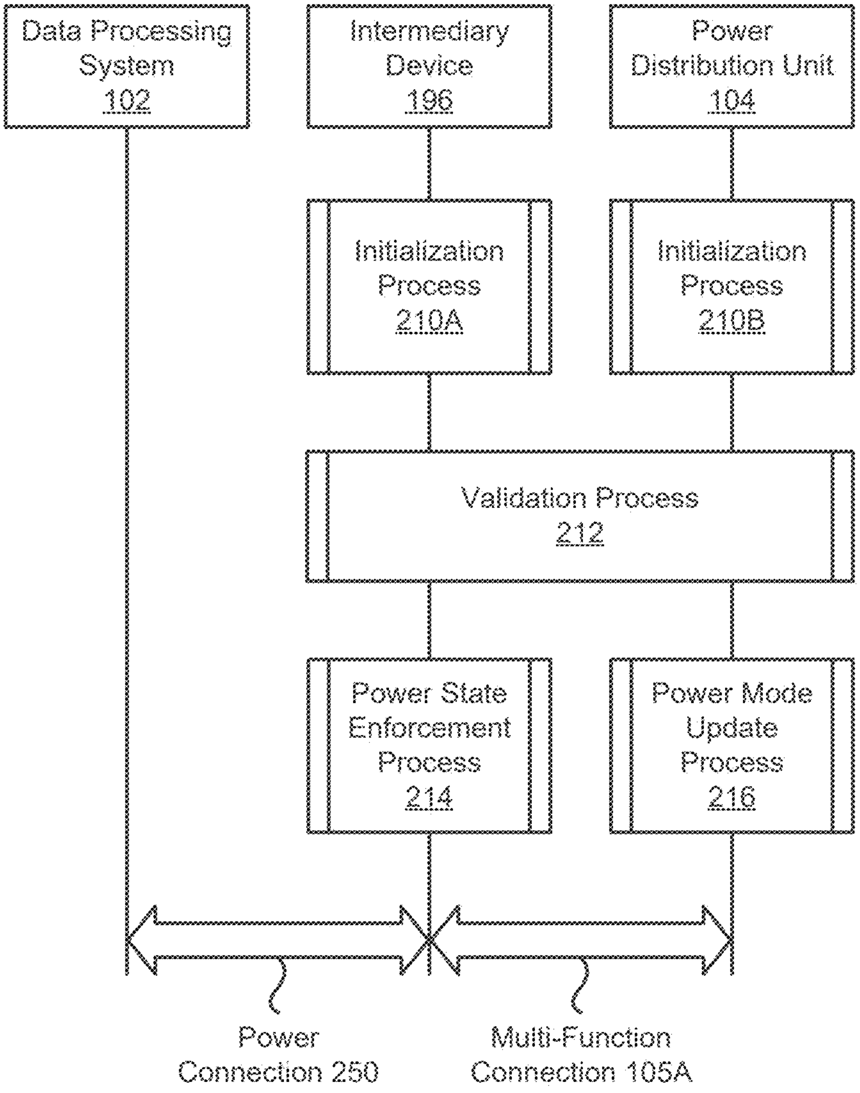
Figure 3:
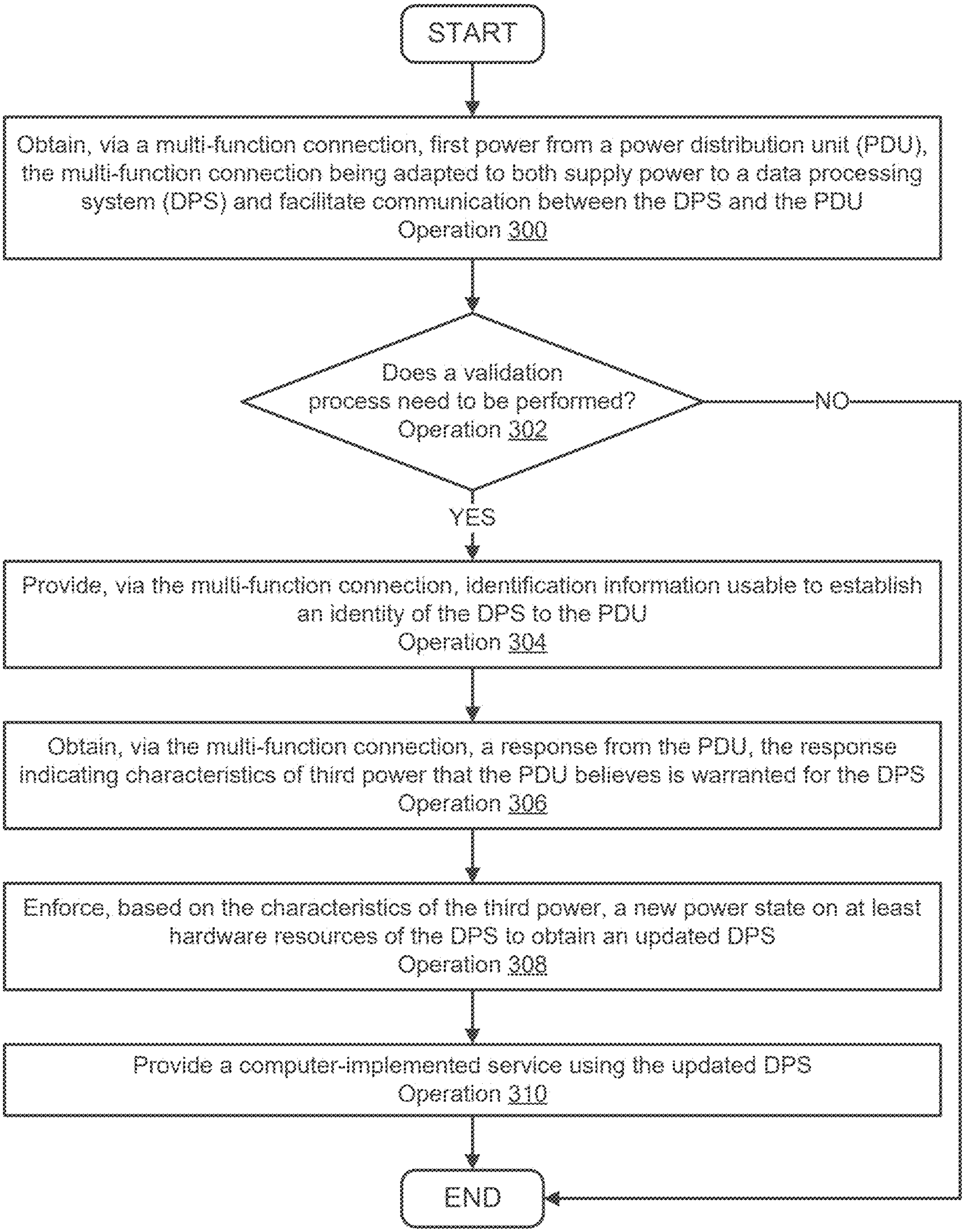
FIG. 3 shows a flow diagram illustrating a method in accordance with an embodiment.

When providing their functionality, any of data processing system 102, power distribution unit 104, and/or components thereof may perform all, or a portion of the actions and methods illustrated in FIGS. 2A-3.

Any of data processing system 102 and power distribution unit 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

Any of the components illustrated in FIG. 1A may be operably connected to each other (and/or components not illustrated) with a communication system. The communication system may facilitate communications between the components of FIG. 1A. In an embodiment, the communication system includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

For example, the communication system may include out-of-band communication system 106A and in-band communication system 106B. Out-of-band communication system 106A may facilitate communication between the out-of-band components of data processing system 102, power distribution unit 104, and/or other devices connected to out-of-band communication system 106A; whereas in-band communication system 106B may facilitate communication between in-band components of data processing system 102 and other entities (e.g., devices) connected to in-band communication system 106B. While shown separately in FIG. 1A, out-of-band communication system 106A and in-band communication system 106B may be the same communication system.

While illustrated in FIG. 1A as including a limited number of specific components, a system in accordance with an embodiment may include fewer, additional, and/or different components than those illustrated therein.

Figure 1B:
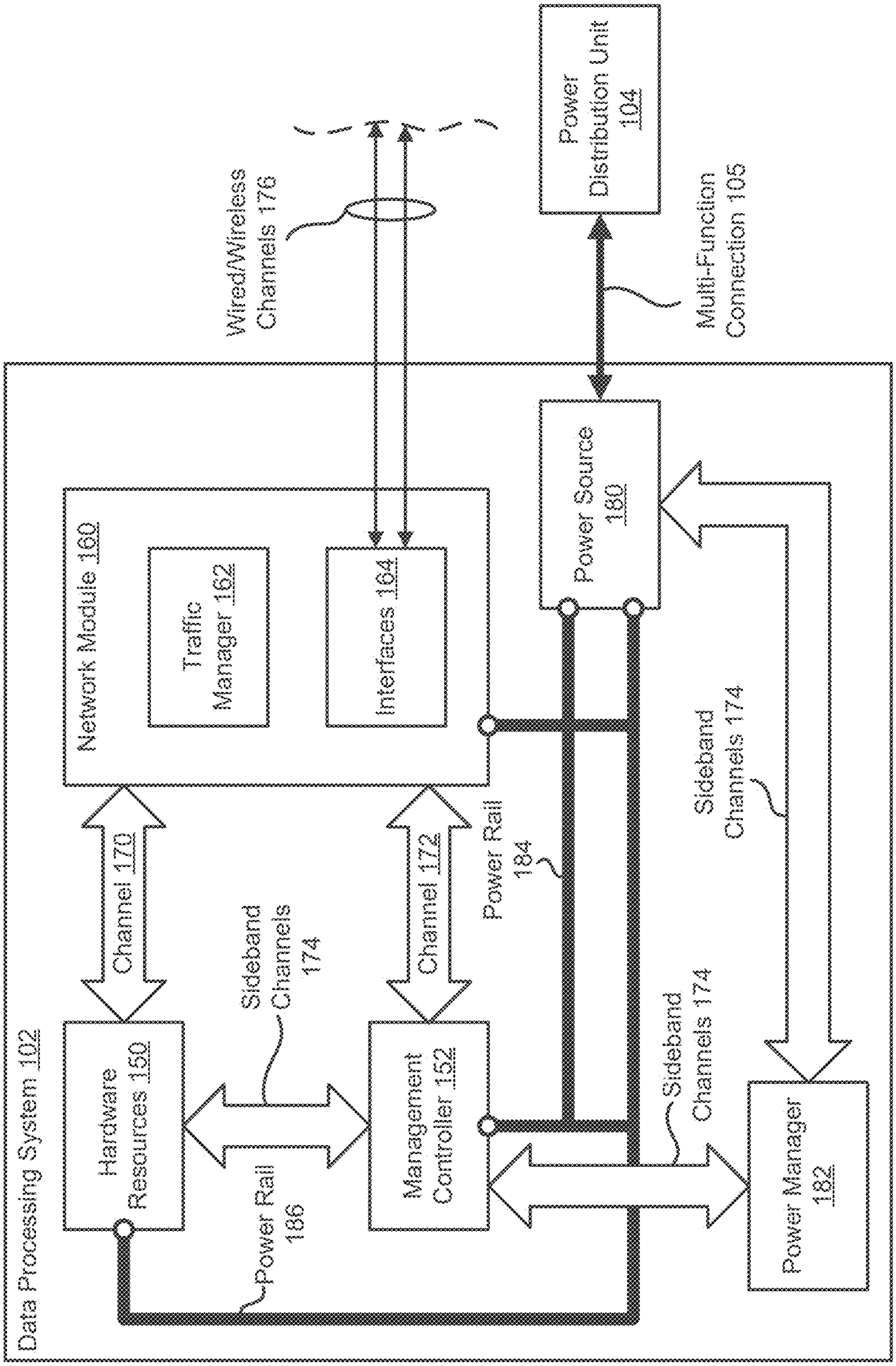
FIG. 1B shows a block diagram illustrating a data processing system in accordance with an embodiment.

Turning to FIG. 1B, a diagram illustrating a data processing system in accordance with an embodiment is shown. Data processing system 102 shown in FIG. 1B may be similar to any of the computing devices shown in FIG. 1A.

To provide computer-implemented services, data processing system 102 may include any quantity of hardware resources 150. Hardware resources 150 may be in-band (hardware) components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150 of a host data processing system 102). Management controller 152 may provide various management functionalities for data processing system 102. Management controller 152 may, for example, monitor various ongoing processes performed by the in-band components, may manage power distribution, thermal management, and/or may perform other functions for managing data processing system 102.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels).

The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, when managing power consumption by hardware resources 150, management controller 152 may use sideband channels 174 to initiate and/or perform, at least in part (e.g., in cooperation with hardware resources 150), actions for enforcing a new power state on hardware resources 150.

To reduce the likelihood of indirect compromise of an application hosted by hardware resources 150, management controller 152 may, for example, enable information from other devices to be provided to the application without traversing the network stack and/or management entities of hardware resources 150. To do so, the other devices may direct communications including the information to management controller 152.

Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted components may not result in indirect compromise of any management controller 152, and entities hosted by management controller 152.

To facilitate communication with other devices, data processing system 102 may include network module 160. Network module 160 may provide communication services for in-band components and out-of-band components (e.g., management controller 152) of data processing system 102. To do so, network module 160 may include traffic manager 162, and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a Wi-Fi card, a wireless local area network card, a wired local area network card, an optical communication card, and/or other types of communication components. These components may support any number of wired/wireless channels 176.

Thus, from the perspective of an external device, the in-band components and out-of-band components of data processing system 102 may appear to be two independent network entities that may be independently addressable and/or otherwise unrelated to one another.

To power hardware resources 150 and/or other components of data processing system 102, data processing system 102 may include power source 180. Power source 180 may include any type of power source (e.g., a power supply, a battery, etc.) and may distribute power to hardware resources 150 and/or the other components (e.g., management controller 152) via power rails 186 and/or 184.

Power source 180 may provide an amount of power consistent with ratings for power source 180 (e.g., maximum power output, efficiency). Power source 180 may obtain a supply of power from a PDU (e.g., power distribution unit 104) via a multi-function connection (e.g., multi-function connection 105, multi-function connections 105A-105N shown in FIG. 1C and FIGS. 2A-2B.). For example, multi-function connection 105 may be connected to a receptacle of power source 180 and a receptable (e.g., a power port) of power distribution unit 104.

Power source 180 may include components for obtaining power and/or data from power distribution unit 104. For example, power source 180 may include components adapted to filter data signal from power signal to obtain responses from power distribution unit 104. Power source 180 may participate in power onboarding for data processing system 102. To do so, power source 180 may include components for exchanging data with power distribution unit 104 over multi-function connection 105.

For example, power source 180 may include a component adapted to encode data onto (or decode data from) a carrier signal distributed via multi-function connection 105 to facilitate communications with power distribution unit 104. The data may include identification information such as an identifier for data processing system 102 and/or a component thereof (e.g., an identifier for power source 180), signed data structures, and/or other information usable to authenticate data processing system 102 during power onboarding. The identification information may be stored in local memory of power source 180 and/or by other components of data processing system 102.

To manage power distribution to hardware resources 150, data processing system 102 may include power manager 182. Power manager 182 may manage power distribution to hardware resources 150 from power source 180 (e.g., supplied via power rail 184 and/or power rail 186). To do so, power manager 182 may communicate with power source 180 and/or management controller 152 via sideband channels 174.

Power manager 182 may participate in power onboarding for data processing system 102. For example, power manager 182 may (i) obtain and/or analyze data (e.g., responses from power distribution unit 104, obtained via power source 180 over sideband channels 174) to identify new power states for data processing system 102, (ii) communicate with management controller 152 regarding power states for data processing system 102 (e.g., provide the responses to management controller 152 for analysis), (iii) monitor power consumption by hardware resources 150 over time, (v) report changes in power consumption by power source 180 over time to management controller 152 and/or other components, and/or (vi) perform other actions relating to power onboarding and/or managing power consumption by portions of hardware resources 150 (e.g., actions for enforcing new power states on hardware resources 150).

Any of management controller 152, power manager 182, power source 180, and/or other components of data processing system 102 may store (e.g., in local memory) and/or manage identification information for data processing system 102. Thus, when providing the identification information to power distribution unit 104 over multi-function connection 105, the identification information may first be provided to power source 180 by another component of data processing system 102 via sideband channels 174.

To facilitate management of data processing system 102 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 are unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, power source 180 may separately supply power to the power rails (e.g., power rail 184, power rail 186) that power the respective power domains. Power from the power source 180 may be selectively provided to the separate power rails to selectively power the different power domains. Management controller 152 may cooperate with power manager 182 to manage supply of power to these power domains. Management controller 152 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 1C:
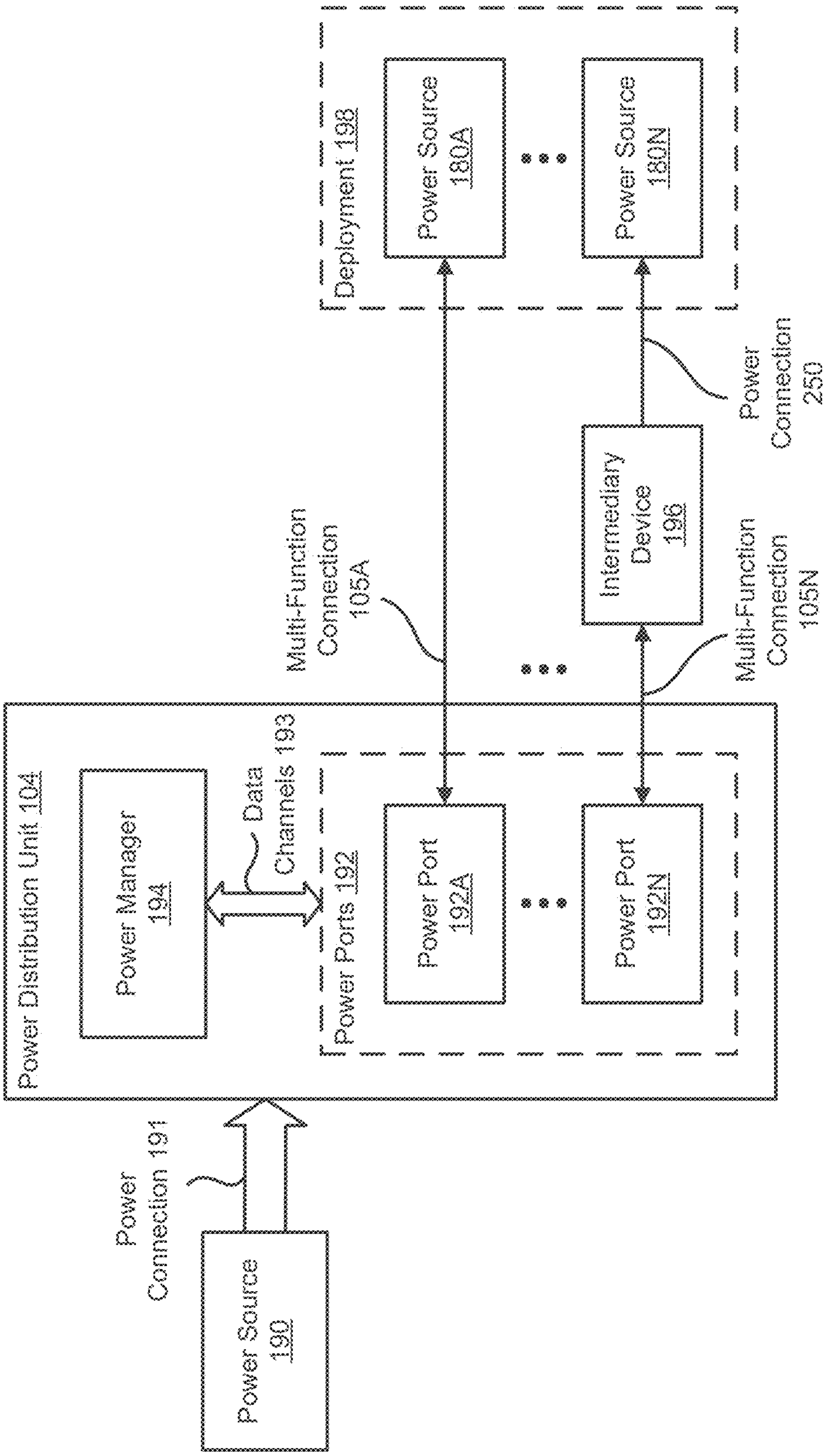
FIG. 1C shows a block diagram illustrating an example of a power distribution system in accordance with an embodiment.

Turning to FIG. 1C, a diagram illustrating a power distribution system in accordance with an embodiment is shown. Power distribution unit 104 shown in FIG. 1C may be similar to any of the computing devices shown in FIG. 1A. The power distribution system may include power source 190, power distribution unit 104, and/or other components (not shown).

The power distribution system may distribute power to a deployment of data processing systems, such as deployment 198. Deployment 198 may include any number of data processing systems (e.g., similar to data processing system 102). For example, deployment 198 may be subdivided into groups (e.g., racks) of data processing systems for powering purposes. In FIG. 1C, a group of data processing systems is shown to include power sources 180A-180N. Power sources 180A-180N may be powered via power distribution unit 104 (e.g., a rack PDU).

Power distribution unit 104 may include any PDU included in the power distribution system. Power distribution unit 104 may include any number of power ports 192

(e.g., 192A-192N) by which power is provided to power sources (e.g., 180A-180N) via distinct multi-function connections. Power sources 180A-180N may be similar to power source 180 of FIG. 1B, and multi-function connections 105A-105N may be similar to multi-function connection 105 of FIG. 1B.

The multi-function connections (e.g., 105A-105N) may be adapted to supply power to connected components of data processing systems (e.g., power sources, intermediary devices) and facilitate communication (e.g., data exchange) between the components and power distribution unit 104. To facilitate data exchange over multi-function connections 105A-105N, any of power ports 192 may include special hardware (e.g., filters, modulators, and/or other hardware circuitry, not shown) for decoding data (e.g., identification information) obtained via a carrier signal of a corresponding multi-function connection and/or encoding data (e.g., responses) onto the carrier signal.

In the example shown in FIG. 1C, power source 180A of a first data processing system of deployment 198 may be connected to power port 192A via multi-function connection 105A. Therefore, the first data processing system (e.g., power source 180A) may communicate with and receive power from power distribution unit 104 via multi-function connection 105A. A second data processing system of deployment 198 may include power source 180N and intermediary device 196. The second data processing system (e.g., power source 180N) may receive power from intermediary device 196 via power connection 250. Power connection 250 may include any type of connection adapted to provide power to power source 180N from intermediary device 196 (e.g., a power cable). Intermediary device 196 may be connected to power port 192N via multi-function connection 105N, and may communicate with and receive power from power distribution unit 104 via multi-function connection 105N.

For example, the second data processing system may be a legacy device that is not adapted to participate in power onboarding. In other words, power source 180N may not include (i) functionality for transmitting and/or receiving data via a multi-function connection, and/or (ii) identification information suitable for performing power onboarding may not be available to (components of) the second data processing system. Therefore, the second data processing system may include intermediary device 196, and intermediary device 196 may be adapted to participate in power onboarding on behalf of the second data processing system.

Intermediary device 196 may include any device adapted to pass power obtained from a PDU to a power source of a data processing system. For example, intermediary device 196 may include power draw limiting circuitry to manage (magnitudes of) power provided to the power source from the PDU. Intermediary device 196 may be external to the data processing system and may be a device such as a dongle and/or an adapter. Intermediary device 196 may be connected to the PDU via a multi-function connection and connected to the power source via a power connection 250. In the example shown in FIG. 1C, intermediary device 196 is connected to power port 192N via multi-function connection 105N and connected to power source 180N via power connection 250. As shown, power source 180N is not connected to the PDU via any multi-function connections.

Intermediary device 196 may include functionality similar to power source 180 of FIG. 1B. For example, intermediary device 196 may include components for obtaining power and data from power distribution unit 104 via multi-function connection 105N (e.g., components adapted to filter data signal from power signal). Intermediary device 196 may participate in power onboarding on behalf of the second data processing system by, for example, providing identification information to power distribution unit 104 via multi-function connection 105N.

Power distribution unit 104 may obtain power via power connection 191 from power source 190. Power connection 191 may include any type of connection usable for transmitting power from power source 190 to power distribution unit 104. Power source 190 may include one or more components usable to convert utility level power (e.g., power from a utility power grid) to data center level power (e.g., power usable by a data center and/or to power any number of deployments (e.g., deployment 198) and/or data processing systems. For example, power source 190 may include a complicated architecture of one or more connected components (e.g., transformers, switches, power and/or bypass panels, power distribution units, batteries, back-up generators) and may connect to a large-scale source of power.

To manage power distribution from power source 190 to the group of power sources (e.g., 180A-180N), power distribution unit 104 may include power manager 194. Power manager 194 may use data channels 193 to manage power distribution. For example, power manager 194 may use data channels 193 to (i) monitor power consumption via each of power ports 192, (ii) obtain data from and/or provide data to power ports 192 (e.g., identification data, responses, and/or instructions for managing power distribution via power ports 192), and/or (iii) perform other actions relating to power distribution and/or management.

Power manager 194 may manage and/or participate in power onboarding for data processing systems of power sources 180A-180N (e.g., connected data processing systems). For example, power manager 194 may (i) store validation data (e.g., in local memory) usable to validate portions of identification information (e.g., credentials) for the connected data processing systems, (ii) participate in validation processes for the connected data processing systems (e.g., using the validation data), (iii) identify power modes for power ports 192 based in part, on results of the validation processes, and/or (iv) enforce the power modes on power ports 192 over time.

While a power mode is being enforced on power port 192A, power distributed via power port 192A to power source 180A may be provided in accordance with power characteristics of the power mode. For example, when the power mode is being enforced, (i) a magnitude of power demanded by power source 180A may be provided (e.g., always, or for a period of time), (ii) power may not be provided to power source 180A (e.g., always, or for a period of time), and/or (iii) a maximum magnitude of power may be provided to power source 180A (e.g., always, or for a period of time, defined by tiers of power privileges and/or current loads on power distribution unit 104 or other components of the power distribution system).

Power manager 194 may include functionality for exchanging data with other devices remote to power distribution unit 104. For example, power distribution unit 104 may include network components (not shown) and may be connected to a communication system (e.g., out-of-band communication system 106A of FIG. 1A). Power manager 194 may provide data (e.g., via communication channels, not shown) to a network component of power distribution unit 104 for transmission to a management entity (e.g., an orchestrator).

For example, power manager 194 may request input from the management entity by providing a portion of identification information for a data processing system to a remote management system. In response, the management system may provide (i) input regarding power modes and/or characteristics of power warranted for the data processing system, and/or (ii) authorization for clearing flags set in memory of power distribution unit 104 regarding previously invalidated data processing systems.

For the purposes of clarity, the example shown in FIG. 1C includes one power distribution unit 104 powering one group (e.g., one rack) of power sources (e.g., 180A-180N) of deployment 198. However, in practice, it may be appreciated that a power distribution system may include multiple PDUs (e.g., similar to power distribution unit 104), each providing power to other groups of power sources of deployment 198 not shown in FIG. 1C.

To further clarify embodiments disclosed herein, interaction diagrams in accordance with an embodiment are shown in FIGS. 2A-2B. The interaction diagrams may illustrate how data may be obtained and used within the system of FIGS. 1A-1C.

In the interaction diagrams, processes performed by and interactions between components of a (distributed) system in accordance with an embodiment are shown. In the diagrams, components of the system are illustrated using a first set of shapes (e.g., 102, 104, etc.), located towards the top of each figure. Lines descend from these shapes. Processes performed by the components of the system are illustrated using a second set of shapes (e.g., 200A, 200B) superimposed over these lines. Processes superimposed over lines of two or more components (e.g., 202, 212) may indicate cooperative operation of the components during the processes (e.g., data exchange between the components).

Generally, the processes are temporally ordered in an example order, with time increasing from the top to the bottom of each page. For example, the process labeled as 202 may occur prior to the process labeled as 204. However, it will be appreciated that the processes may be performed in different orders, any may be omitted, and other processes may be performed without departing from embodiments disclosed herein.

Turning to FIG. 2A, a first interaction diagram in accordance with an embodiment is shown. The first interaction diagram may illustrate processes and interactions that may occur during power onboarding for a data processing system. In the example shown in FIG. 2A, data processing system 102 may include functionality for participating in power onboarding. For example, data processing system 102 may store identification information usable to establish an identity of data processing system 102 with power distribution unit 104, and may be enabled to communicate with power distribution unit 104 using power-line communication technology.

To initiate power onboarding, data processing system 102 may perform initialization process 200A and/or power distribution unit 104 may perform initialization process 200B. Initialization processes 200A and/or 200B may be initiated when a power connection is established between power distribution unit 104 and data processing system 102. The power connection may be established over multi-function connection 105A (e.g., similar to multi-function connection 105 of FIG. 1B and/or multi-function connection 105A of FIG. 1C). For example, the power connection may be established when a power cable connected to (e.g., plugged into a power receptacle of) a power source of data processing system 102 is plugged into a power port of power distribution unit 104.

Prior to performance of initialization process 200B, power distribution unit 104 may be operating in a default power mode. For example, the default power mode may include a power-off mode (e.g., providing no power via the power port) or a low-power mode (e.g., providing a small magnitude of power sufficient to detect a change in electrical characteristics of the power port and/or devices connected to the power port over time). To prompt performance of initialization process 200B, power distribution unit 104 may detect that the power connection has been established. For example, if power distribution unit 104 is operating in the power-off mode, then the connection may be detected via a mechanical switch, or if power distribution unit 104 is operating in the low-power mode, then the connection may be detected based on a change in electrical characteristics of the power port (e.g., an increase in power draw via the power port).

During initialization process 200B, the power mode may be updated for power distribution unit 104 (e.g., from the default power mode) in accordance with policies for a power distribution system of which power distribution unit 104 is a component. For example, if the default power mode for the power port of power distribution unit 104 facilitating multi-function connection 105A is unsuitable for performing power onboarding (e.g., in a power-off mode), then the power port may be placed in a power mode suitable for power onboarding (e.g., in a low-power mode). During initialization processes 200A and/or 200B, data processing system 102 may obtain power from power distribution unit 104 via multi-function connection 105A in accordance with the policies.

The policies may define power modes for power distribution unit 104 based on characteristics of power. For example, the characteristics of power may include (i) limits on (e.g., minimum, maximum) magnitudes of power provided to data processing system 102, and/or (ii) limits on periods of time that power is to be provided via the power port (e.g., start times, stop times, power ramping instructions). In other words, the policies may specify limits on power consumption by data processing system 102 over time. When enforced, the policies may prevent occurrences of unexpected increases in power consumption, such as power consumption spikes that may occur at instants when power connections are established.

For example, the policies may specify that first power provided via the power port during initialization process 200B (e.g., first power obtained by data processing system 102 during initialization process 200A) may be a magnitude of power sufficient for performing power onboarding and insufficient for data processing system 102 to operate in a desired manner (e.g., by a user of data processing system 102), and the first power may be provided to data processing system 102 for a period of time estimated to be sufficient for power onboarding to complete (and/or until the power connection is terminated).

During initialization process 200A, data processing system 102 may determine whether validation process 202 needs to be performed based on characteristics of the first power. To do so, data processing system 102 may analyze (e.g., quantify) the first power. For example, data processing system may obtain a magnitude of the first power (e.g., in Watts) and compare the first power to a power threshold. The power threshold may be based on a magnitude of power required for data processing system 102 to operate in a desired manner. The power threshold may be determined, for example, by a manufacturer, an administrator, and/or a user of data processing system 102.

For example, if the magnitude of the first power is inferior to the power threshold, then data processing system 102 may determine that validation process 202 needs to be performed before second power of sufficient magnitude (e.g., for data processing system 102 to operate in a desired manner) will be made available to data processing system 102 from power distribution unit 104. Validation process 202 may be performed while the first power is being distributed via multi-function connection 105A and/or may include a cooperative process between data processing system 102 and power distribution unit 104.

During validation process 202, data may be exchanged between data processing system 102 and power distribution unit 104 via multi-function connection 105A (e.g., a handshake may be performed). For example, as discussed with respect to FIGS. 1A-1C, to exchange data, a power manager of power distribution unit 104 and/or a power source of data processing system 102 may each encode data onto and/or decode data from a carrier signal of multi-function connection 105A. During validation process 202, data processing system 102 may establish an identity with power distribution unit 104.

For example, data processing system 102 (e.g., components thereof) may store identification information for data processing system 102. The identification information may include (i) an identifier for data processing system 102, (ii) cryptographically verifiable information usable to identify power privileges for data processing system 102, and/or (iii) other information usable to validate data processing system 102. For example, the identification information may include a data structure signed using a private key controlled by data processing system 102.

During validation process 202, data processing system 102 (e.g., the power source) may provide the identification information to power distribution unit 104 (e.g., to the power port) over multi-function connection 105A via (i) transmission via a message, (ii) storing in a storage with subsequent retrieval by power distribution unit 104, (iii) a publish-subscribe system where power distribution unit 104 subscribes to updates from data processing system 102 thereby causing a copy of the identification information to be propagated to power distribution unit 104, and/or (iv) other processes. The identification information may be provided to power distribution unit 104 while the first power is being distributed via multi-function connection 105A. Upon obtaining the identification information, power distribution unit 104 may attempt to authenticate data processing system 102.

To authenticate data processing system 102, power distribution unit 104 may implement any means of cryptography (e.g., certificate key exchange, hashing, embedded passwords). Power distribution unit 104 may store and/or have access to credentials usable to validate data processing system 102, such as a public key corresponding to the private key used to sign the data structure of the identification information. For example, power distribution unit 104 may obtain and use the public key to perform decryption and/or hashing operations in order to verify the signed data structure is authentic and unaltered.

If power distribution unit 104 is able to validate data processing system 102, then power distribution unit 104 may (i) identify a new power mode for the power port providing power to data processing system 102, and/or (ii) obtain a response for data processing system 102. The response and/or the new power mode may be specified by a policy regarding power allowances for data processing system 102. For example, power distribution unit 104 may use a portion of the identification information (e.g., the identifier for data processing system 102) to identify the policy. The policy may indicate power privileges for data processing system 102.

The power privileges may be defined in part, by a priority level for data processing system 102 (e.g., with respect to other devices being powered by the power distribution system) and/or limits on power consumption by data processing system 102 (e.g., temporal limits, limits on magnitude). For example, maximum magnitudes of power provided to data processing system 102 over time may be based on power demands on (and capacities of): power distribution unit 104, the power distribution system, and/or a large-scale power source that supplies power to the power distribution system. The new power mode and/or the response may reflect the power privileges for data processing system 102.

The response may indicate, for example, (i) whether authentication of data processing system 102 was successful, and/or (ii) characteristics of third power that power distribution unit 104 believes is warranted for data processing system 102 (e.g., according to the policies and/or power privileges).

The response may be based on input from a management entity of power distribution unit 104. For example, during validation process 202, power distribution unit 104 may communicate with a remote device (not shown) in order to (i) authenticate data processing system 102, (ii) obtain policies for data processing system 102, (iii) obtain information regarding power available to power distribution unit 104 (e.g., based on power demands on the power distribution system), and/or (iv) obtain other information for identifying characteristics of power warranted for data processing system 102. For example, power distribution unit 104 may communicate with the remote device using out-of-band communication system 106A of FIG. 1A.

During validation process 202, power distribution unit 104 may provide the response to data processing system 102 over multi-function connection 105A via (i) transmission via a message, (ii) storing in a storage with subsequent retrieval by data processing system 102, (iii) a publish-subscribe system where data processing system 102 subscribes to updates from power distribution unit 104 thereby causing a copy of the response to be propagated to data processing system 102, and/or (iv) other processes. The response may be provided to data processing system 102 while the first power is being distributed via multi-function connection 105A.

Based on the response obtained from power distribution unit 104, data processing system 102 may (i) notify an entity (e.g., a user, an administrator) regarding whether authentication of data processing system 102 by power distribution unit 104 was successful, and/or (ii) identify at least one power state associated with the characteristics of the third power that power distribution unit 104 believes is warranted for data processing system 102. When enforced, the power state may modify power consumption by data processing system 102 (e.g., over time). Therefore, data processing system 102 may consume power in accordance with the policies and/or the power privileges.

For example, if authentication of data processing system 102 was not successful, then a user of data processing system 102 may be presented with a message indicating so. The user may reinitiate initialization process 200A, initialization process 200B, and/or validation process 202 by re-establishing (e.g., disconnecting and reconnecting) multi-function connection 105A. However, if authentication of data processing system 102 was successful, then data processing system 102 may present a message to the user indicating so and/or may enforce the power state on at least hardware resources of data processing system 102. The power state may be enforced at a specified point in time, based on information included in the response (e.g., as indicated by temporal limitations of the characteristics of the third power).

To enforce the power state, data processing system 102 may perform power state enforcement process 204. During power state enforcement process 204, instructions for enforcing the power state on at least the hardware resources may be obtained and/or executed. For example, a power manager of data processing system 102 may obtain, execute and/or provide instructions to other components of data processing system 102 (e.g., the hardware resources, a management controller).

The instructions may include instructions for (i) modifying configuration settings of the hardware resources (e.g., increasing or reducing clock speeds), (ii) activating (or deactivating) components of the hardware resources (e.g., a graphics processing unit), (iii) activating (or deactivating) portions of components of the hardware resources (e.g., a core of a multi-core processor), and/or (iv) performing other actions to modify power consumption by the hardware resources. Execution of the instructions may update operation of the hardware resources, thereby updating (operation of) data processing system 102.

To manage power distribution to data processing system 102, power distribution unit 104 may perform power mode update process 206. During power mode update process 206, power distribution unit 104 may enforce the new power mode (e.g., identified during validation process 202) on the power port facilitating multi-function connection 105A. For example, power distribution unit 104 may increase a magnitude of power distributed via the power port (e.g., over time for power ramping) in order to place the power port in the new power mode (from the default power mode).

Although not shown in FIG. 2A, power distribution unit 104 may provide power to other connected data processing systems via other power ports of power distribution unit 104 and other distinct multi-function connections. The other power ports of power distribution unit 104 may be operating in different power modes that reflect validation statuses and policies (e.g., power privileges) of the other connected data processing systems.

Once the power port is placed in the new power mode, multi-function connection 105A may transmit the third power to updated data processing system 102. The third power may be sufficient for data processing system 102 to operate in a desired manner (e.g., same as the second power); enabling data processing system 102 to operate in the desired manner while providing computer-implemented services.

However, if the third power is insufficient for data processing system 102 to operate in the desired manner, then data processing system 102 may (i) generate a notification regarding the third power (e.g., throw an error), (ii) provide the notification to other entities (e.g., present an error message to a user, transmit the notification to another device), (iii) shut down, (iv) enter a new power state (e.g., an ultra-low power state), (v) re-attempt authentication (e.g., initiate performance of validation process 202), and/or (vi) perform other actions.

Turning to FIG. 2B, a second interaction diagram in accordance with an embodiment is shown. The second interaction diagram may illustrate processes and interactions that may occur during power onboarding for a data processing system using an intermediary device. In the example shown in FIG. 2B, data processing system 102 may not include functionality for participating in power onboarding.

For example, data processing system 102 may not (i) store identification information usable to establish an identity of data processing system 102 with power distribution unit 104, and/or (ii) be enabled to communicate with power distribution unit 104 using power-line communication technology. Therefore, intermediary device 196 may be connected to data processing system 102 via power connection 250 (e.g., using a power cable or other type of connector adapted to provide power to data processing system 102 from intermediary device 196). As discussed with respect to FIG. 1C, intermediary device 196 may be enabled to exchange data and/or otherwise communicate with power distribution unit 104 using power-line communication technology.

To initiate power onboarding, intermediary device 196 may perform initialization process 210A and/or power distribution unit 104 may perform initialization process 210B. Initialization process 210A may be similar to initialization process 200A of FIG. 2A (e.g., performed by intermediary device 196 on behalf of data processing system 102), and initialization process 210B may be similar to initialization process 200B of FIG. 2A.

For example, during initialization processes 210A and 210B, intermediary device 196 may (i) obtain power (e.g., first power) from power distribution unit 104 via multi-function connection 105A in accordance with policies for power distribution unit 104, and (ii) determine whether a validation process needs to be performed (e.g., based on a magnitude of the first power) before second power of sufficient magnitude (e.g., for data processing system 102 to operate in a desirable manner) will be made available to intermediary device 196 from power distribution unit 104.

Validation process 212 may be similar to validation process 202 of FIG. 2A. For example, during validation process 212, intermediary device 196 and power distribution unit 104 may exchange data over multi-function connection 105A using methods similar to those described during validation process 202 of FIG. 2A. The data may be exchanged to establish mutual trust between intermediary device 196 and/or power distribution unit 104 (e.g., intermediary device 196 may be authenticated by power distribution unit 104), and/or to otherwise perform power onboarding for intermediary device 196.

For example, intermediary device 196 may use multi-function connection 105A to (i) provide identification information (e.g., stored in memory of intermediary device 196) usable to establish an identity of intermediary device 196 to power distribution unit 104, and/or (ii) obtain a response (e.g., based on the identification information) from power distribution unit 104 indicating characteristics of third power warranted for intermediary device 196.

By doing so, (i) power distribution unit 104 may use the identification information to identify and enforce a power mode for distributing power to intermediary device 196, defined by policies and/or power privileges associated with (authenticated) intermediary device 196, and/or (ii) intermediary device 196 may use the response to identify and enforce a power state that reflects the characteristics of the third power.

To enforce the power mode on power distribution unit 104, power distribution unit 104 may perform power mode update process 216. Power mode update process 216 may be similar to power mode update process 206 of FIG. 2A. For example, power distribution unit 104 may enforce limits (e.g., temporal limits, limits on magnitude) on power provided via a power port facilitating multi-function connection 105A.

To enforce the power state on intermediary device 196, intermediary device 196 may perform power state enforcement process 214. Power state enforcement process 214 may be similar to power state enforcement process 204 of FIG. 2A. For example, during power state enforcement process 214, intermediary device 196 may (i) limit power provided via power connection 250 (e.g., power drawn by data processing system 102), and/or (ii) communicate with data processing system 102 (e.g., via a network connection through a communication system such as out-of-band communication system 106A) regarding characteristics of the third power, which may cause data processing system 102 to modify its power consumption via power connection 250 (e.g., data processing system 102 may perform a process to update operation of its hardware resources as described with respect to power state enforcement process 204 of FIG. 2A).

Therefore, the third power may be provided from power distribution unit 104 to data processing system 102 via intermediary device 196 (e.g., via multi-function connection 105A and power connection 250) in accordance with power privileges established for data processing system 102. Using the third power, data processing system 102 may provide computer-implemented services.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using processes and interactions shown in FIGS. 2A-2B, power onboarding for a data processing system may be performed over a multi-function connection using power-line communication technology. By doing so, power consumption by (e.g., power distribution to) the data processing system may be managed automatically (e.g., in real-time) without requiring additional types of connections.

Turning to FIG. 3, a flow diagram illustrating a method in accordance with an embodiment is shown. The flow diagram may illustrate various operations performed when managing operation of a data processing system.

At operation 300, first power may be obtained by the data processing system from a PDU via a multi-function connection. The first power may be obtained by (i) establishing a power connection with the PDU (e.g., connecting the multi-function connection to a power source of the data processing system and/or to a power port of the PDU), (ii) performing an initialization process (e.g., similar to initialization process 200A of FIG. 2A and/or initialization process 210A of FIG. 2B), and/or (iii) other methods. For example, the data processing system may be connected to the PDU via the multi-function connection. The multi-function connection may be adapted to both supply power to the data processing system and facilitate communication between the data processing system and the PDU.

At operation 302, a determination regarding whether a validation process needs to be performed may be made based on a magnitude of the first power before second power of sufficient magnitude will be made available to the data processing system from the PDU. The determination may be made by (i) obtaining a magnitude of the first power (e.g., using power consumption measurement circuitry), (ii) comparing the magnitude of the first power to a power threshold, and/or (iii) by other methods (e.g., obtaining a notification indicating whether the validation process needs to be performed).

For example, the power threshold may indicate a magnitude of power sufficient for the data processing system to operate in a manner desired by a user or an administrator of the data processing system. If the magnitude of the first power is inferior to the power threshold, then the data processing system may determine that the validation process needs to be performed before obtaining the second power of sufficient magnitude. Otherwise, if the magnitude of the first power is not inferior to the power threshold (e.g., the first power is of sufficient magnitude), then the data processing system may determine that the validation process does not need to be performed.

If the validation process does not need to be performed, then the method may end following operation 302 (e.g., the data processing system may provide a computer-implemented service using the first power). However, if the validation process needs to be performed, then the method may proceed to operation 304 following operation 302.

At operation 304, identification information usable to identify the data processing system may be provided to the PDU via the multi-function connection. The identification information may be provided by methods described with respect to validation process 202 of FIG. 2A, validation process 212 of FIG. 2B, and/or by other methods. For example, while the first power is being distributed via the multi-function connection, a data package including the identification information may be encoded onto a carrier signal distributed via the multi-function connection using an encoding technique that modulates the carrier signal to reflect information in the data package.

At operation 306, a response indicating characteristics of third power that the PDU believes is warranted for the data processing system may be obtained via the multi-function connection. The response may be provided by methods described with respect to validation process 202 of FIG. 2A, validation process 212 of FIG. 2B, and/or by other methods. For example, while the first power is being distributed via the multi-function connection, a modulated carrier signal (e.g., modulated to reflect a data package including the response) may be decoded (e.g., by a component of the data processing system) to obtain the response.

At operation 308, a new power state may be enforced on at least hardware resources of the data processing system based on the characteristics of the third power to obtain an updated data processing system. The new power state may be enforced by the data processing system by methods described with respect to power state enforcement process 204 of FIG. 2A, power state enforcement process 214 of FIG. 2B, and/or by other methods.

Obtaining the updated data processing system may include updating operation of the hardware resources. For example, the operation of the hardware resources may be updated to increase a likelihood of compliance with limits of the characteristics of the third power by (i) powering or depowering components of the hardware resources, (ii) powering or depowering portions of components of the hardware resources, and/or (iii) modifying configuration settings of components of the hardware resources that may affect power consumption by the data processing system.

At operation 310, a computer-implemented service may be provided using the updated data processing system. The computer-implemented service may be provided using the updated data processing system by (i) obtaining instructions for providing the computer-implemented service (e.g., user input, input from another device), (ii) providing the instructions to the hardware resources (e.g., inserting the instructions into an execution flow of a component of the hardware resources), and/or (iii) allowing execution of the instructions by the hardware resources while the hardware resources are operating in the new power state.

The method may end following operation 310.

Thus, as illustrated above, embodiments disclosed herein may provide systems and methods for managing power onboarding for data processing systems using power-based communications. By leveraging existing multi-function connections that power the data processing systems to facilitate data exchange during power onboarding, additional connectivity and/or manual efforts may not be required to manage power consumption by (and/or power distribution to) the data processing systems.

Figure 4:
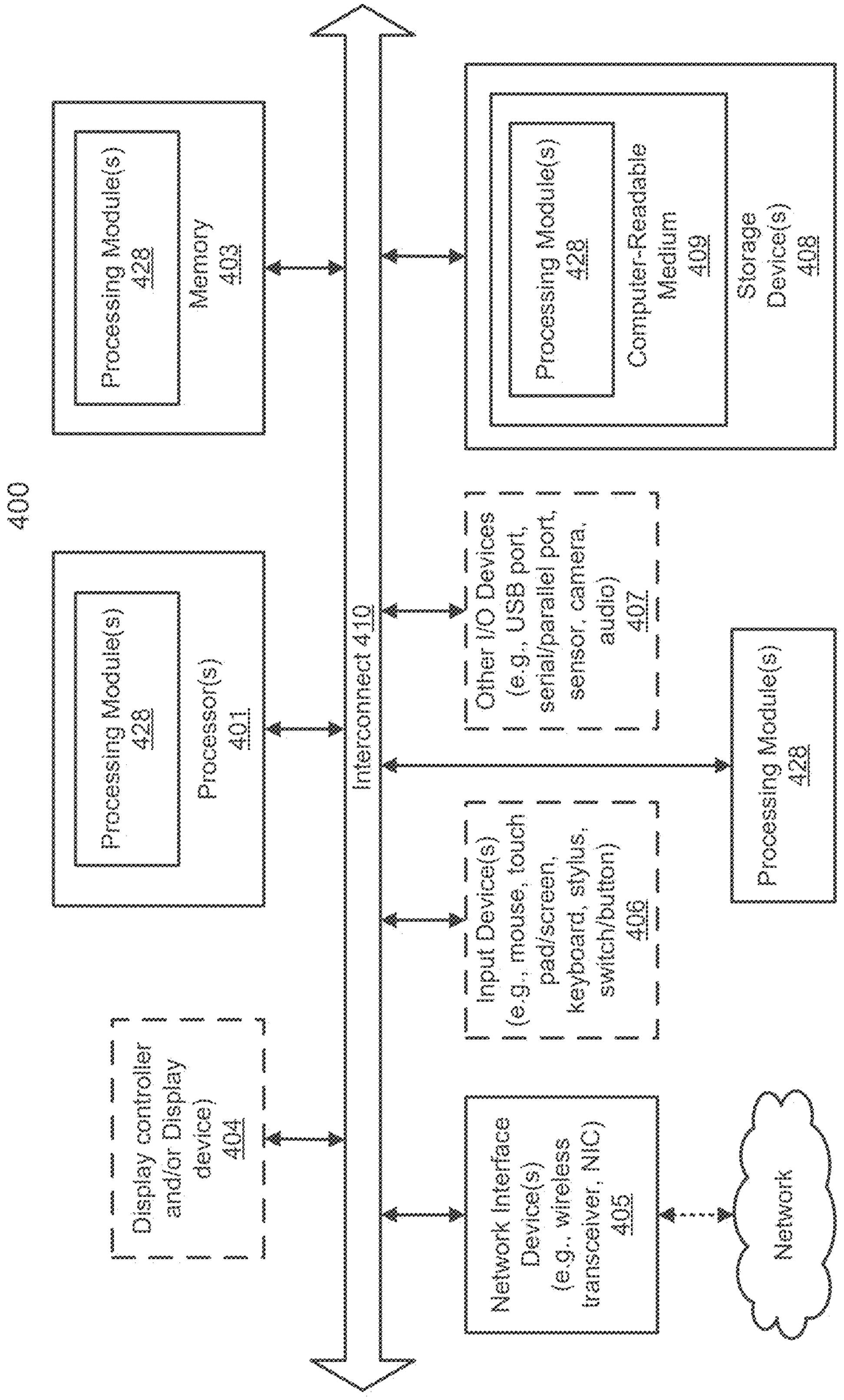
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

obtaining, by the data processing system and via a multi-function connection, first power from a power distribution unit (PDU), the multi-function connection being adapted to both supply power to the data processing system and facilitate communication between the data processing system and the PDU;

making a determination, by the data processing system, regarding whether a validation process needs to be performed based on a magnitude of the first power before second power of sufficient magnitude will be made available to the data processing system from the PDU; and in a first instance of the determination where the validation process needs to be performed:

providing, by the data processing system and via the multi-function connection, identification information usable to establish an identity of the data processing system to the PDU, obtaining, by the data processing system and via the multi-function connection, a response from the PDU, the response indicating characteristics of third power that the PDU believes is warranted for the data processing system, enforcing, by the data processing system and based on the characteristics of the third power, a new power state on at least hardware resources of the data processing system to obtain an updated data processing system, and providing, by the updated data processing system, a computer-implemented service.

2. The method of claim 1, wherein the identification information comprises cryptographically verifiable information usable to identify power privileges for the data processing system.

3. The method of claim 2, wherein the identification information comprises an identifier for the data processing system.

4. The method of claim 3, wherein the identification information comprises a signed data structure, the signed data structure being signed using a private key controlled by the data processing system, and the PDU having access to a public key corresponding to the private key.

5. The method of claim 2, wherein enforcing the new power state modifies power consumption by the data processing system in accordance with the power privileges.

6. The method of claim 5, wherein the new power state is enforced at a point in time indicated by the response.

7. The method of claim 1, wherein the response is based on input from a management entity of the PDU.

8. The method of claim 1, wherein the providing of the identification information and the obtaining of the response are performed while the first power is being distributed via the multi-function connection.

9. The method of claim 1, wherein the data processing system comprises an intermediary device adapted to pass power obtained from the PDU to a power source of the data processing system, the intermediary device being connected to the PDU via the multi-function connection, and the power source not being connected to the PDU via any multi-function connections.

10. The method of claim 9, wherein the intermediary device provides the identification information to the PDU and obtains the response from the PDU.

11. The method of claim 1, wherein the PDU is adapted to obtain data center level power and supply power source level power via distinct multi-function connections to at least the data processing system.

12. The method of claim 1, wherein the data processing system is connected to the PDU via an out-of-band communication channel that runs through a network module of the data processing system and the out-of-band communication channel services a management controller of the data processing system.

13. The method of claim 12, wherein the data processing system is connected to at least one other entity via an in-band communication channel that also runs through the network module and the in-band communication channel services the hardware resources.

14. A non-transitory machine-readable medium having instructions stored therein, which when executed by a processor, cause the processor to perform operations for managing a data processing system, the operations comprising:

obtaining, by the data processing system and via a multi-function connection, first power from a power distribution unit (PDU), the multi-function connection being adapted to both supply power to the data processing system and facilitate communication between the data processing system and the PDU;

making a determination, by the data processing system, regarding whether a validation process needs to be performed based on a magnitude of the first power before second power of sufficient magnitude will be made available to the data processing system from the PDU; and in a first instance of the determination where the validation process needs to be performed:

providing, by the data processing system and via the multi-function connection, identification information usable to establish an identity of the data processing system to the PDU, obtaining, by the data processing system and via the multi-function connection, a response from the PDU, the response indicating characteristics of third power that the PDU believes is warranted for the data processing system, enforcing, by the data processing system and based on the characteristics of the third power, a new power state on at least hardware resources of the data processing system to obtain an updated data processing system, and providing, by the updated data processing system, a computer-implemented service.

15. The non-transitory machine-readable medium of claim 14, wherein the identification information comprises cryptographically verifiable information usable to identify power privileges for the data processing system.

16. The non-transitory machine-readable medium of claim 15, wherein the identification information comprises an identifier for the data processing system.

17. The non-transitory machine-readable medium of claim 16, wherein the identification information comprises a signed data structure, the signed data structure being signed using a private key controlled by the data processing system, and the PDU having access to a public key corresponding to the private key.

18. A data processing system, comprising:

a processor; and a memory coupled to the processor to store instructions, which when executed by the processor, cause operations for managing the data processing system to be performed, the operations comprising:

obtaining, by the data processing system and via a multi-function connection, first power from a power distribution unit (PDU), the multi-function connection being adapted to both supply power to the data processing system and facilitate communication between the data processing system and the PDU, making a determination, by the data processing system, regarding whether a validation process needs to be performed based on a magnitude of the first power before second power of sufficient magnitude will be made available to the data processing system from the PDU, and in a first instance of the determination where the validation process needs to be performed:

providing, by the data processing system and via the multi-function connection, identification information usable to establish an identity of the data processing system to the PDU;

obtaining, by the data processing system and via the multi-function connection, a response from the PDU, the response indicating characteristics of third power that the PDU believes is warranted for the data processing system;

enforcing, by the data processing system and based on the characteristics of the third power, a new power state on at least hardware resources of the data processing system to obtain an updated data processing system; and providing, by the updated data processing system, a computer-implemented service.

19. The data processing system of claim 18, wherein the identification information comprises cryptographically verifiable information usable to identify power privileges for the data processing system.

20. The data processing system of claim 19, wherein the identification information comprises an identifier for the data processing system.

* * * * *